United States Patent
Nakayama et al.

(10) Patent No.: US 11,498,013 B2
(45) Date of Patent: Nov. 15, 2022

(54) CARD, CARD READING SYSTEM, AND CARD SET

(71) Applicant: Sony Interactive Entertainment Inc., Tokyo (JP)

(72) Inventors: Tetsunori Nakayama, Tokyo (JP); Ayako Kochu, Kanagawa (JP); Yoshinori Kotsugai, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 19 days.

(21) Appl. No.: 17/267,233

(22) PCT Filed: Aug. 9, 2019

(86) PCT No.: PCT/JP2019/031681
§ 371 (c)(1),
(2) Date: Feb. 9, 2021

(87) PCT Pub. No.: WO2020/036146
PCT Pub. Date: Feb. 20, 2020

(65) Prior Publication Data
US 2021/0162310 A1     Jun. 3, 2021

(30) Foreign Application Priority Data
Aug. 17, 2018   (JP) .............................. JP2018-153623

(51) Int. Cl.
*A63H 18/02*     (2006.01)
*A63H 17/395*     (2006.01)
(Continued)

(52) U.S. Cl.
CPC ........... *A63H 17/395* (2013.01); *A63H 18/02* (2013.01); *A63H 18/16* (2013.01); *G09B 19/0053* (2013.01); *A63H 2200/00* (2013.01)

(58) Field of Classification Search
CPC ........ E04H 3/14; A63H 30/04; A63H 17/395; A63H 18/02; A63H 18/16; A63B 63/004; E01C 13/083; E01C 2013/006
(Continued)

(56) References Cited

U.S. PATENT DOCUMENTS

| | | | |
|---|---|---|---|
| 6,012,957 A * | 1/2000 | Cyrus | .................... A63H 18/02 |
| | | | 446/175 |
| 2002/0102910 A1 * | 8/2002 | Donahue | ................ A63H 18/16 |
| | | | 446/465 |

(Continued)

FOREIGN PATENT DOCUMENTS

| | | |
|---|---|---|
| CN | 101971230 A | 2/2011 |
| CN | 106504614 A | 3/2017 |

(Continued)

OTHER PUBLICATIONS

The First Office Action for corresponding CN Patent Application No. 201980054466, 19 pages, dated Dec. 29, 2021.
(Continued)

*Primary Examiner* — Kien T Nguyen
(74) *Attorney, Agent, or Firm* — Matthew B. Dernier, Esq.

(57) ABSTRACT

Provided is a self-propelled reading device to read cards more reliably. Each of the cards includes a first end part configured to be adjacent to another card in a predetermined direction; a second end part configured to be on the opposite side of the first end part and adjacent to another card different from the first end part; and a surface printed with a pattern in which are coded coordinates indicating a positional relation relative to a reference line extended in the predetermined direction indicative of a region in which a self-propelled device is to travel. Each of the first and the second end parts has a positioning part regulating how the other card adjacent to the end part is to be placed. The (Continued)

positioning parts and the reference line have a predetermined positional relation therebetween.

6 Claims, 12 Drawing Sheets

(51) Int. Cl.
    *A63H 18/16*     (2006.01)
    *G09B 19/00*     (2006.01)

(58) Field of Classification Search
    USPC .................................. 446/436, 484
    See application file for complete search history.

(56) References Cited

U.S. PATENT DOCUMENTS

| | | | | |
|---|---|---|---|---|
| 2009/0111356 | A1* | 4/2009 | Haass | A63H 18/023 |
| | | | | 246/415 A |
| 2010/0230198 | A1 | 9/2010 | Frank | |
| 2010/0297597 | A1 | 11/2010 | Kim | |
| 2010/0304640 | A1 | 12/2010 | Sofman | |
| 2017/0007915 | A1* | 1/2017 | Moscatelli | G09B 23/00 |
| 2017/0344127 | A1 | 11/2017 | Hu | |

FOREIGN PATENT DOCUMENTS

| | | |
|---|---|---|
| GB | 2482119 A | 1/2012 |
| JP | 2001228963 A | 8/2001 |
| JP | 3215614 U | 4/2018 |
| TW | M560329 U | 5/2018 |
| TW | M563908 U | 7/2018 |
| WO | 2018025467 A1 | 2/2018 |
| WO | 2018029354 A1 | 12/2018 |

OTHER PUBLICATIONS

Notification of Reasons for Refusal for corresponding Japanese Patent Application No. 2020-537071, 6 pages, dated Oct. 12, 2021.

"KUMIITA—Educational programming toy for 0 year olds on up", URL:https://web.archive.org/web/20170912193658/https://www.kickstarter.com/projects/1599191780/kumiita-educational-programming-toy-for-0-year-old>, 15 pages, Sep. 12, 2017 (for relevancy see Notification of Refusal of Japanese Patent Application No. 2020-537071 cited above).

International Preliminary Report on Patentability and Written Opinion for corresponding PCT Application No. PCT/JP2019/031681, 12 pages, dated Mar. 4, 2021.

International Search Report for corresponding PCT Application No. PCT/JP2019/031681, 4 pages, dated Oct. 29, 2019.

Kumiita Educational programming toy for 0 year olds on up, Kickstarter, ICON Corp, URL:https''//web.archive.org/web/20170912193658/https://www.kickstarter.com/projects/1599191780/kimiita-educational-programming-toy-for-0-year-old> 14 pages, Sep. 12, 2017.

Extended European Search Report for corresponding EP Patent Application No. 19849490.8, 10 pages, dated Apr. 26, 2022.

* cited by examiner

CARD, CARD READING SYSTEM, AND CARD SET

TECHNICAL FIELD

The present invention relates to a card, a card reading system, and a card set.

BACKGROUND ART

Study materials for intuitive programming, for example, are marketed extensively, the materials being cards that are arrayed for programming purposes. Also, study materials that involve the use of cards physically made of paper have been publicized. A user using these materials arrays multiple cards to create a sequence of cards. On each of the multiple cards, a command is written, for example. A camera-equipped self-propelled device is allowed to travel over the card sequence to read information such as commands from the cards.

PTL 1 discloses arrangements in which a user arrays tiles to form a command sequence. A self-propelled device is then placed at one end of the command sequence and allowed to move over the field of command sequences. The self-propelled device reads commands recorded on the individual tiles and, on the basis of the read commands, controls another self-propelled device in movement.

CITATION LIST

Non Patent Literature

[PTL 1] PCT Patent Publication No. WO2018/025467

SUMMARY

Technical Problem

For example, users not skillful with their fingers such as young children have difficulty arraying cards neatly. Meanwhile, depending on how multiple cards are arrayed, the self-propelled device may deviate from the card sequence during reading and may fail to read the subsequent cards.

The present invention has been made in view of the above circumstances. An object of the invention is therefore to provide technology for reading cards more reliably than before.

Solution to Problem

In solving the above problem and according to the present invention, there is provided a card including a first end part configured to be adjacent to another card in a predetermined direction; a second end part configured to be on the opposite side of the first end part and adjacent to another card different from the first end part; and a surface printed with a pattern in which are coded coordinates indicating a positional relation relative to a reference line extended in the predetermined direction indicative of a region in which a self-propelled device is to travel. Each of the first and the second end parts has a positioning part regulating how the other card adjacent to the end part is to be placed. The positioning parts and the reference line have a predetermined positional relation therebetween.

Also according to the present invention, there is provided a card reading system including current position acquisition means configured to acquire the current position of a self-propelled device by recognizing a pattern printed on a card having a first end part and a second end part, the first end part having a positioning part regulating how another card adjacent to the first end part in a predetermined direction is to be placed, the second end part having a positioning part located on the opposite side of the first end part to regulate how another card adjacent to the second end part is to be placed, the pattern being one in which are coded coordinates indicating a positional relation relative to a reference line extended in the predetermined direction; and a travel control section configured to control the self-propelled device to travel on the basis of the acquired current position and the reference line.

Also according to the present invention, there is provided a card set including multiple cards configured to be arrayed in a predetermined direction, each of the cards including a first end part configured to be adjacent to another card; a second end part configured to be on the opposite side of the first end part and adjacent to another card different from the first end part; and a surface printed with a pattern in which are coded coordinates indicating a positional relation relative to a reference line extended in the predetermined direction indicative of a region in which a self-propelled device is to travel. Each of the first and the second end parts has a positioning part regulating how the other card adjacent to the end part is to be placed. The positioning parts and the reference line have a predetermined positional relation therebetween.

Thus, according to the present invention, a self-propelled reading device is enabled to read cards more reliably than before.

In a preferred embodiment of the present invention, the positioning part belonging to one of the first and the second end parts may have a recessed portion and the positioning part belonging to the other end part may have a projected portion in planar view.

In another preferred embodiment of the present invention, the surface may be printed with a line extended in the predetermined direction to constitute the positioning parts.

Another preferred embodiment of the present invention may further include an opening configured to intersect with the reference line in planar view. An additional card printed with a pattern in which are coded the coordinates indicating the positional relation relative to the reference line may be fitted into the opening.

DESCRIPTION OF EMBODIMENT

One embodiment of the present invention is described below with reference to the accompanying drawings. Of the constituent elements that appear in this description, those having the same functions will be designated by the same reference signs, and their explanations will be omitted where redundant. A control system embodying the present invention is explained below as a programming study material in which cards printed with command names are arrayed in a predetermined direction to create a program for hands-on practice (referred to as the "hands-on practice program" hereunder) and the arrayed cards are read by a self-propelled device. With this programming study material, the self-propelled device travels through a maze in accordance with the read program.

Figure 1:
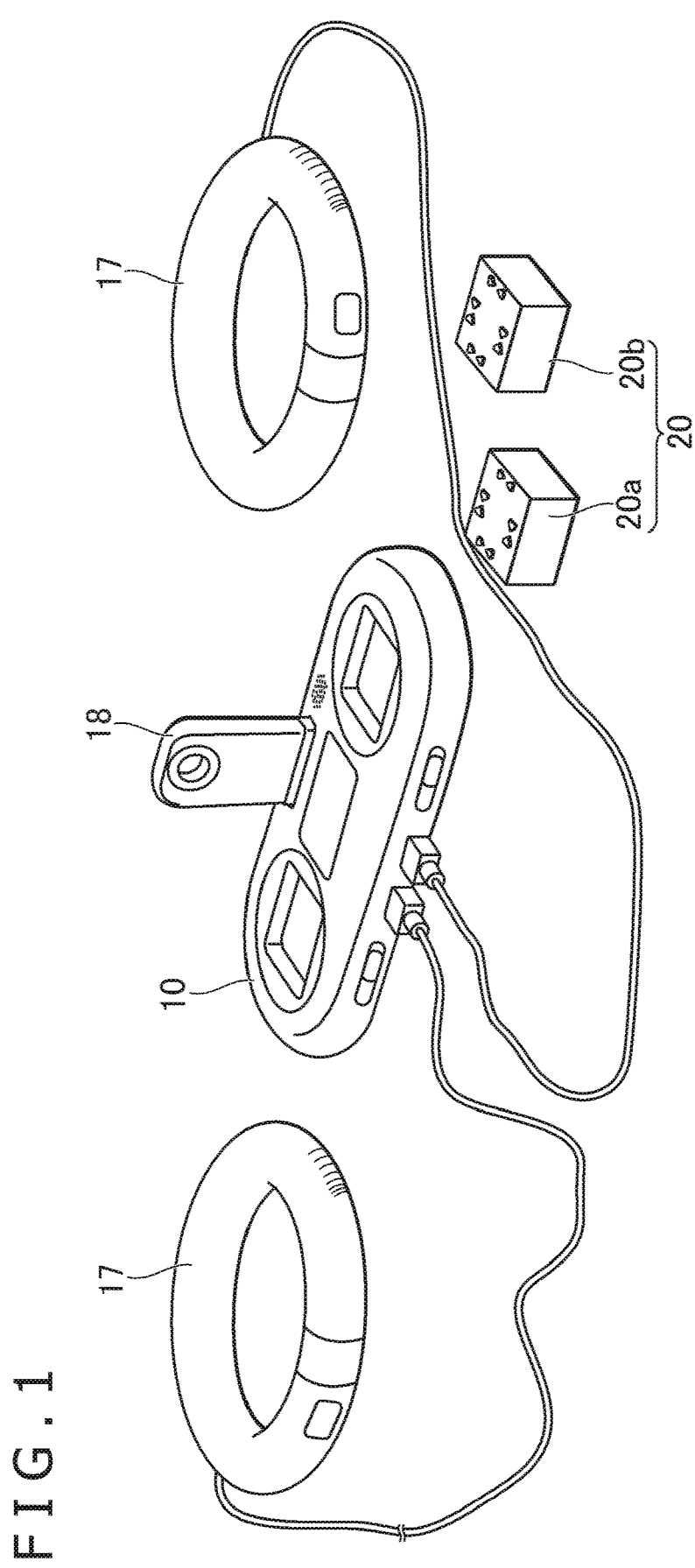
FIG. 1 is a view depicting an example of a control system as an embodiment of the present invention.
Figure 2:
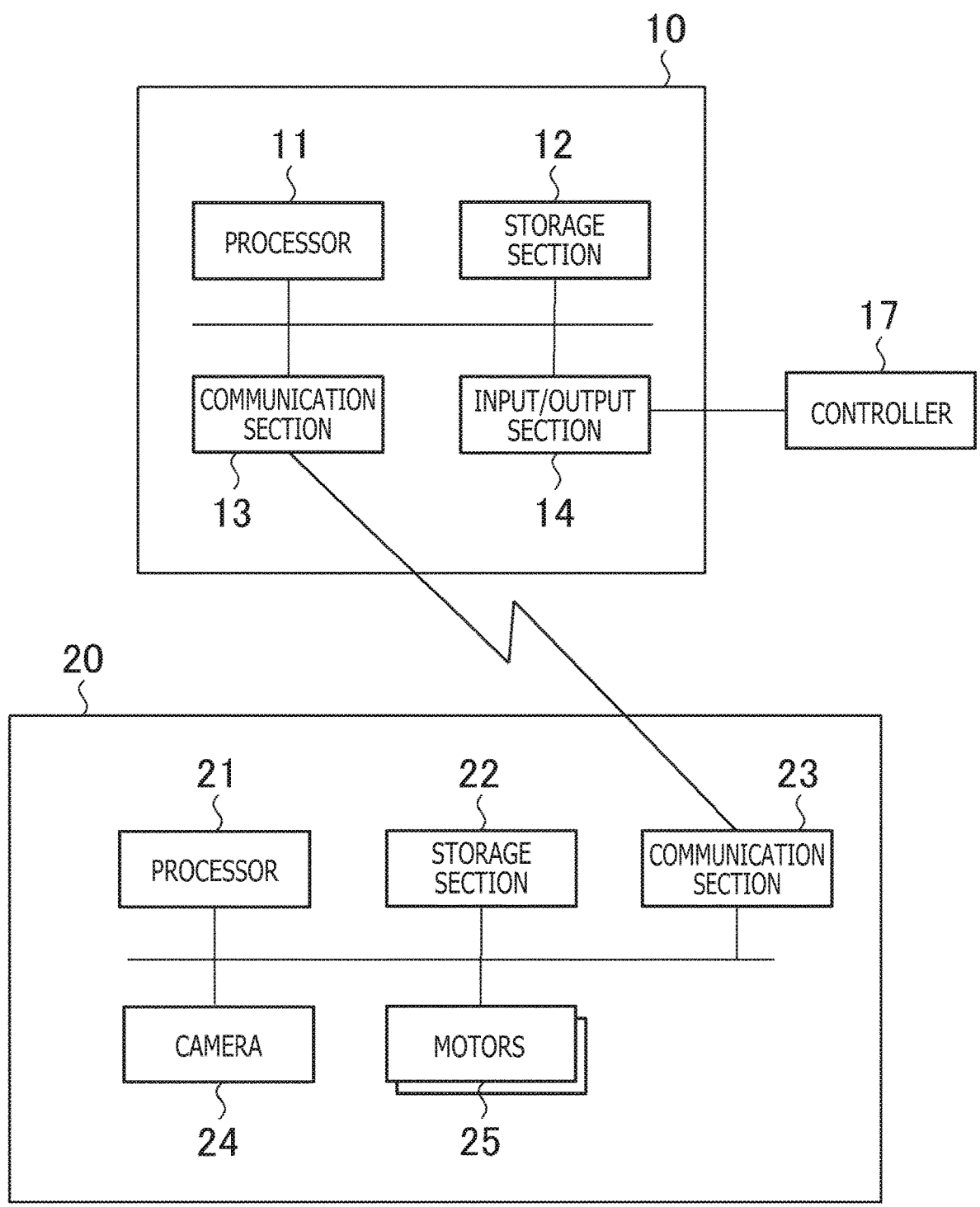
FIG. 2 is a view depicting a hardware configuration of the control system.
Figure 3:
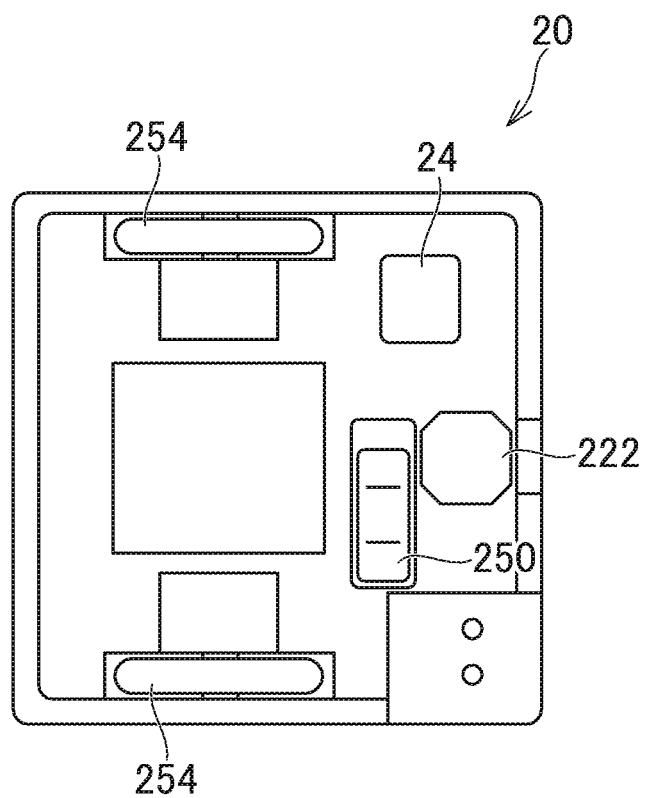
FIG. 3 is a view depicting an example of a carriage.

FIG. 1 is a view depicting an example of the control system as one embodiment of the present invention. FIG. 2 is a view depicting a hardware configuration example of the control system embodying the present invention. The control system of the present invention includes a device control apparatus 10, carriages 20a and 20b, a controller 17, and a cartridge 18. The carriages 20a and 20b are traveling devices equipped with a camera 24 and have the same functions. In the description that follows, the carriages 20a and 20b will be referred to as the carriage 20 where there is no specific need to distinguish the two carriages. The device control apparatus 10 controls the carriage 20 wirelessly. The controller 17 is an input apparatus that acquires operations performed by the user and is connected by cable to the device control apparatus 10. FIG. 3 is a view depicting an example of the carriage 20. FIG. 3 illustrates the carriage 20 as viewed from below. The carriage 20 further includes a power switch 250, a switch 222, and two wheels 254.

The device control apparatus 10 includes a processor 11, a storage section 12, a communication section 13, and an input/output section 14. The carriage 20 includes a processor 21, a storage section 22, a communication section 23, a camera 24, and two motors 25. The device control apparatus 10 may be either a dedicated apparatus for control purposes or a general-purpose computer.

The processor 11 controls the communication section 13 and the input/output section 14 by working in accordance with programs stored in the storage section 12. The processor 21 controls the communication section 23, the camera 24, and the motors 25 by working in accordance with programs stored in the storage section 22. These programs are provided by being stored on computer-readable storage media such as a flash memory in the cartridge 18. The programs may alternatively be provided via networks such as the Internet.

The storage section 12 includes a dynamic random access memory (DRAM) and a flash memory incorporated in the device control apparatus 10 and the flash memory in the cartridge 18. The storage section 22 includes a DRAM and a flash memory. The storage sections 12 and 22 store the above-mentioned programs. Also, the storage sections 12 and 22 store information and operational results input from the processors 11 and 21 and from the communication sections 13 and 23.

The communication sections 13 and 23 include integrated circuits and antennas for communicating with other devices. The communication sections 13 and 23 have a function of communicating with each other by Bluetooth (registered trademark) protocol, for example. Under control of the processors 11 and 21, the communication sections 13 and 23 input the information received from other apparatuses to the processors 11 and 21 and to the storage sections 12 and 22, and transmit information to other apparatuses. Preferably, the communication section 13 may have a function of communicating with other apparatuses via networks such as a local area network (LAN).

The input/output section 14 includes circuits for acquiring information from input devices such as the controller 17 and circuits for controlling output devices such as a sound output device and an image display device. The input/output section 14 acquires an input signal from the input device, converts the input signal into information, and inputs the information to the processor 11 and to the storage section 12. Also, under control of the processor 11, the input/output section 14 causes speakers to output sounds and the display device to output images.

The motors 25 are what are generally called servo motors of which the rotating direction, the amount of rotation, and the rotational speed are controlled by the processor 21. The two motors 25 are each assigned one wheel 254, and each motor 25 drives the assigned wheel 254.

The camera 24 arranged to image the lower side of the carriage 20 captures patterns printed on a sheet 31 (see FIG. 4) on which the carriage 20 is placed. With this embodiment, the sheets 31 are printed with patterns recognizable in the infrared frequency domain. The camera 24 captures such infrared-sensitive images on the sheets.

Figure 4:
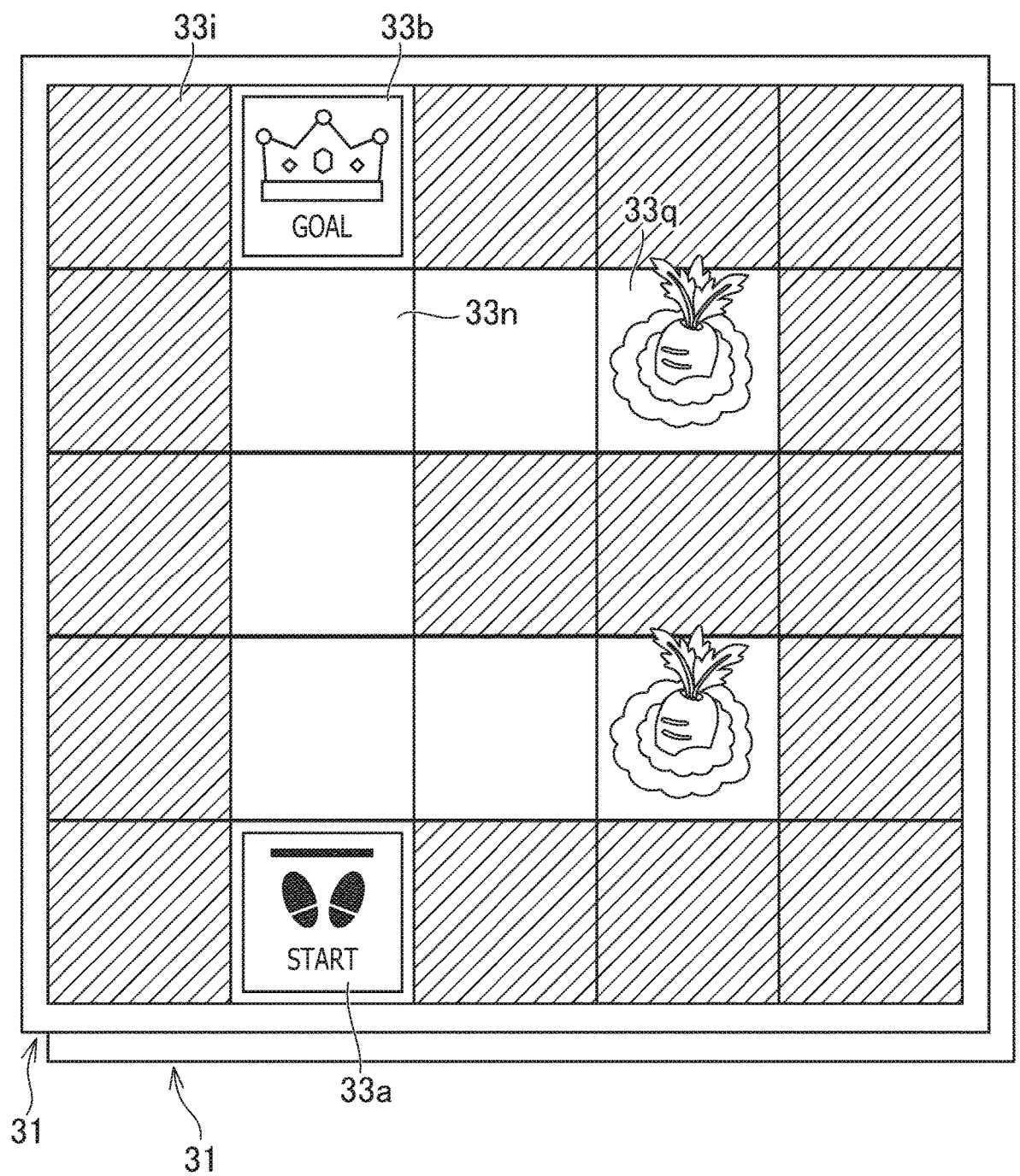
FIG. 4 is a view depicting an example of sheets on which the carriage is placed.

FIG. 4 is a view depicting an example of the sheet 31 on which the carriage 20 is placed. FIG. 4 gives the example in which multiple sheets 31 are provided in book form. Each of the sheets 31 is printed with an image visible to the user and with a pattern that can be captured by the camera 24. In the example of FIG. 4, a maze formed by 5×5 squares constitutes the image visible to the user. The maze is arranged for programming study purposes. The user creates a simplified hands-on practice program, with the carriage 20 made to move from a start square 33a of the maze in accordance with the created hands-on practice program. In the example of FIG. 4, using programs provided by the cartridge 18, the control system controls the carriage 20 in a manner not traveling over an impassable square 33i. When the carriage 20 arrives at a goal square 33b past ordinary squares 33n and action squares 33q, the device control apparatus 10 outputs a sound signifying that the user has successfully created the practice program.

The patterns printed on the sheets 31 are explained below in more detail. On each sheet 31, unit patterns of a predetermined size (e.g., 0.2 mm square) each are arrayed in a matrix pattern. Each of the unit patterns is an image in which are coded the coordinates of the position at which the pattern is placed. The size of the data to be coded as the pattern is determined in advance. The maximum and minimum values of the coordinates to be coded (i.e., size of the coordinate space) are defined by the size of the data and by the interval at which the unit patterns are arranged. Each sheet 31 is assigned a region corresponding to the size of the sheet 31 out of the coordinate space.

Under the control system of the present embodiment, the camera 24 on the carriage 20 captures the unit patterns printed on the sheet 31. The carriage 20 or the device control apparatus 10 decodes the captured unit patterns to obtain the coordinates. This makes it possible to recognize the position of the carriage 20 over the sheet 31. Also, the carriage 20 or the device control apparatus 10 acquires the coordinates from each of the unit patterns in the image captured by the camera 24 and, based on the positions of the multiple unit patterns in the captured image and on the acquired coordinates, calculates the direction of the carriage 20.

The present embodiment uses the patterns printed on the sheet 31 so as to recognize the position of the carriage 20 on the sheet 31 with high accuracy without recourse to other devices such as a stereo camera.

Figure 5:
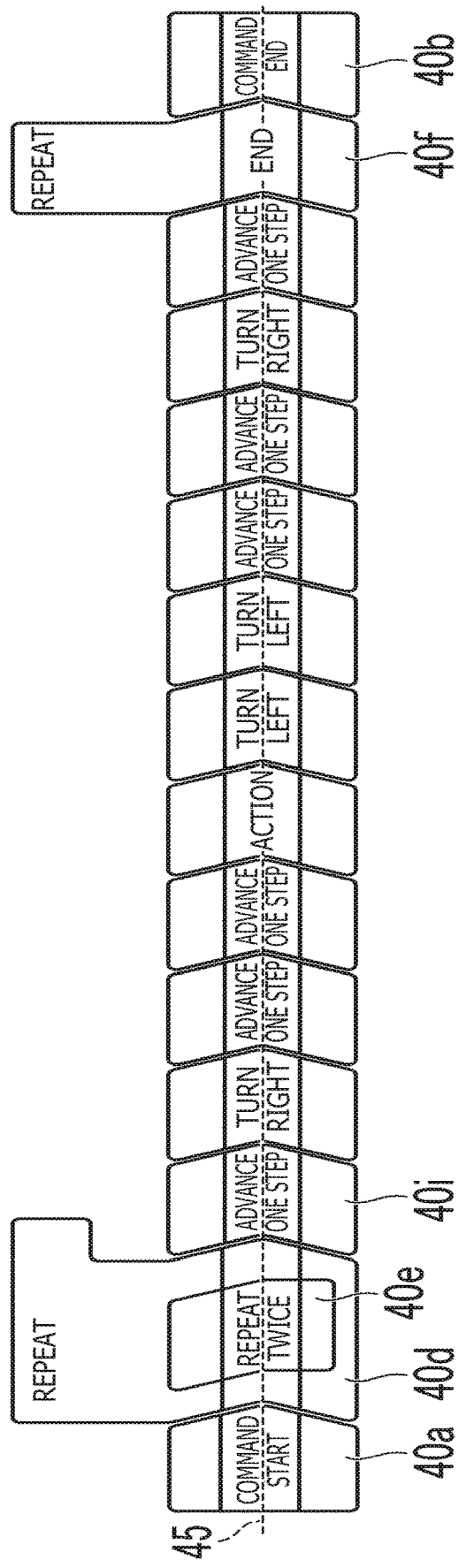
FIG. 5 is a view depicting an example of multiple command cards being arrayed.
Figure 6:
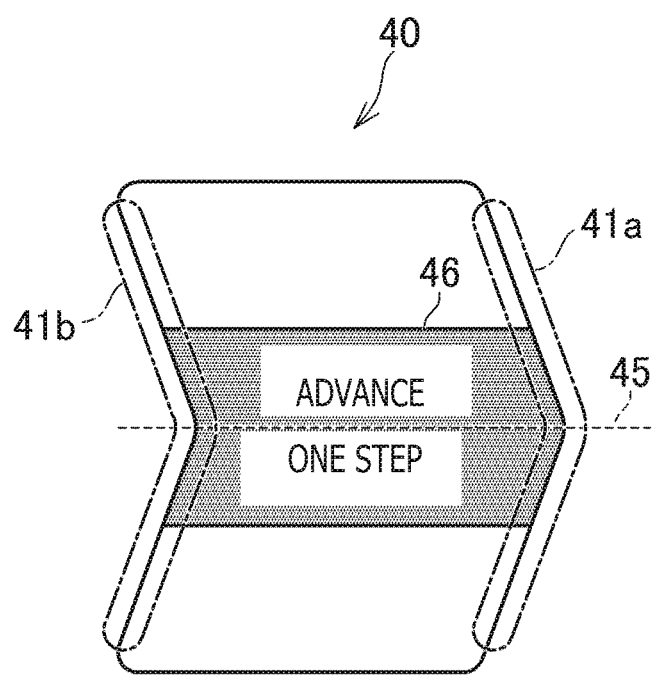
FIG. 6 is a plan view explaining the shape of a command card.

Explained next are the cards for use by the user in creating a program to be read by the control system. FIG. 5 is a view depicting an example of multiple command cards 40 being arrayed. FIG. 6 is a plan view explaining the shape of a command card 40.

The command cards 40 come in various types, such as a command card 40a indicating the start of a program, a command card 40b indicating the end of a program, a command card 40i indicating an ordinary command, a command card 40d indicating a subsequent repeat, a command card 40f indicating the end of a repeat, and an additional card 40e. The command card 40d is furnished with an opening of approximately the same shape as that of the additional card 40e in planar view. The additional card 40e is fitted into that opening. Here, the additional card 40e indicates the number of repeats. As depicted in FIGS. 5 and 6, a reference line 45 extended in the direction in which the command cards 40 are to be arrayed (i.e., reading direction) is defined on the command cards 40. Although not explicitly printed in the examples of FIGS. 5 and 6, the reference line 45 indicates the regions of the command cards 40 in which the carriage 20 travels, particularly the center of these regions.

Each command card 40 includes a first end part configured to be adjacent to anther command card 40 in the reading direction; and a second end part configured to be on the opposite side of the first end part and adjacent to another command card 40. The first end part is furnished with a positioning part 41a, and the second end part with a positioning part 41b.

In the examples of FIGS. 5 and 6, the positioning part 41a is a projected portion and the positioning part 41b is a recessed portion in planar view. The positioning parts 41a and 41b overlap approximately with the first and the second end parts, respectively. The reference line 45 and the positioning parts 41a and 41b have a predetermined positional relation therebetween. More specifically, there is a constant distance between particular points in the positioning parts 41a and 41b (e.g., the top of the projected portion and the deepest point of the recessed portion) on one hand and the reference line 45 on the other hand, regardless of the type of command card 40.

The command card 40 has a region between the first end part and the second end part thereof. In the example of FIG. 6, the command card 40 has a shape formed by an upper parallelogram and a lower parallelogram, the lower side of the upper parallelogram being connected with the upper side of the lower parallelogram. The reference line 45 is located at or near the position where these two parallelograms are connected with each other.

Further, the upper surface of the command card 40 is printed visibly with a marking 46 (hatched region) constituting a thick line and extended in such a manner as to overlap with the reference line 45. As with the sheet 31, the upper surface of the command card 40 is printed with a pattern in which the coordinates of the card in the coordinate space are coded. Unit patterns are arrayed on the command card 40. The unit pattern is an image in which are coded the coordinates of the position at which that unit pattern is placed. The coordinates assigned to the patterns will be discussed later in detail.

In the positioning parts 41a and 41b, the recessed and projected portions may alternatively be at the opposite positions. The positioning parts 41a and 41b may be shaped to be recessed and projected in a manner engaging with each other. As with the command card 40d, either the first end part or the second end part alone (e.g., lower side in FIG. 5) may be furnished with the positioning parts 41a and 41b. The command card 40d is shaped in such a manner that the two parallelograms connected as depicted in FIG. 6 are supplemented with a region at an end part different from the positioning parts 41a and 41b (upper part in FIG. 6). The added region may include a region protruded from the first end part in the reading direction. The protruded region is provided in a manner avoiding interference with the other types of command cards 40.

The positioning part 41a is regulated to engage with the positioning part 41b of another command card 40 adjacent to the first end part, thus keeping in position the other command card 40 in a direction intersecting with the reading direction. Also, the positioning part 41b is regulated to engage with the positioning part 41a of another command card 40 adjacent to the second end part, thereby keeping the other command card 40 in position. Further, the marking 46 is regulated to let the user recognize more easily any positional displacement in the direction intersecting with the reading direction, thus keeping the adjacent command card 40 in position. Alternatively, either the shape of the positioning parts 41a and 41b or the marking 46 alone may be allowed to exist.

The present embodiment is further arranged in such a manner that not only the command cards 40 are simply prevented from being misaligned but also the carriage is allowed to travel on the aligned command cards 40 without deviating therefrom. This arrangement is explained below.

Figure 7:
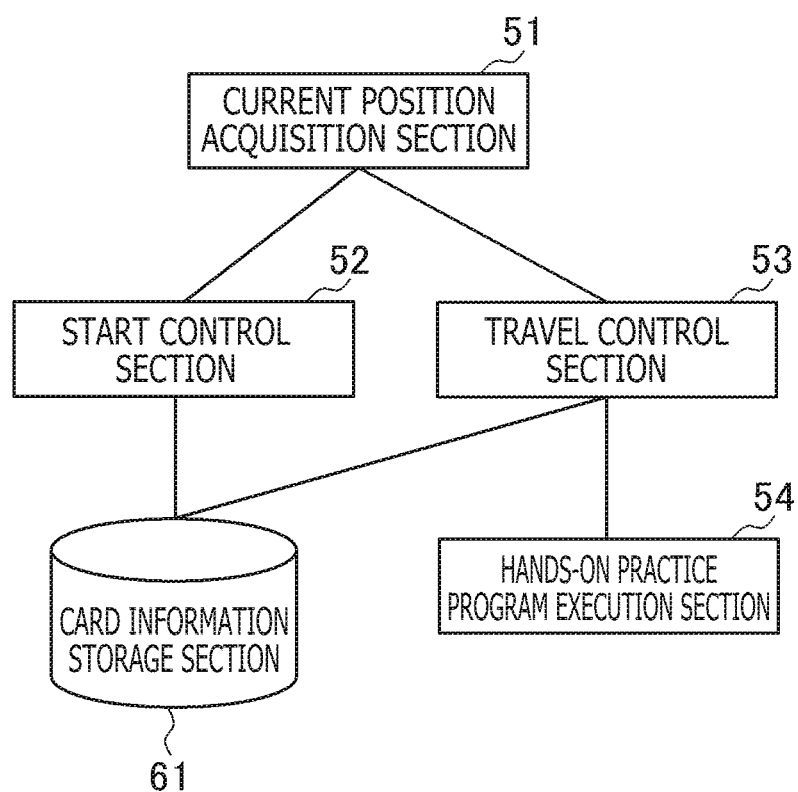
FIG. 7 is a block diagram depicting functions implemented by the control system.

FIG. 7 is a block diagram depicting functions implemented by the control system. The control system includes, functionally, a current position acquisition section 51, a start control section 52, a travel control section 53, a hands-on practice program execution section 54, and a card information storage section 61. The current position acquisition section 51, the start control section 52, and the travel control section 53 are implemented mainly by the processor 11 in the device control apparatus 10 executing programs stored in the storage section 12 so as to control the carriage 20 via the communication section 13. Also, part or all of the functions of the current position acquisition section 51 are implemented by the processor 21 in the carriage 20 executing programs stored in the storage section 22 and exchanging data with the device control apparatus 10 via the communication section 23 to thereby control the camera 24 and the motors 25. The card information storage section 61 is a sort of database implemented by the storage section 12 in the device control apparatus 10, the database storing information regarding the command cards 40.

From the image captured by the camera 24, the current position acquisition section 51 acquires the pattern in which the coordinates are coded. Given the coordinates indicated by the pattern, the current position acquisition section 51 acquires the coordinates in which the carriage 20 is positioned as well as the direction of the carriage 20.

The start control section 52 acquires from the current position acquisition section 51 the coordinates indicating the position at which the carriage 20 is first placed. The start control section 52 then adjusts the position and direction of the carriage 20 in such a manner that the sequence of arrayed command cards 40 can correctly be read in.

The travel control section 53 controls the direction in which the carriage 20 travels by successively reading the command cards 40 in sequence.

The hands-on practice program execution section 54 executes the hands-on practice program designated by the sequence of the read command cards 40 so as to control the operation of the carriage 20 placed on the sheet 31.

Figure 8:
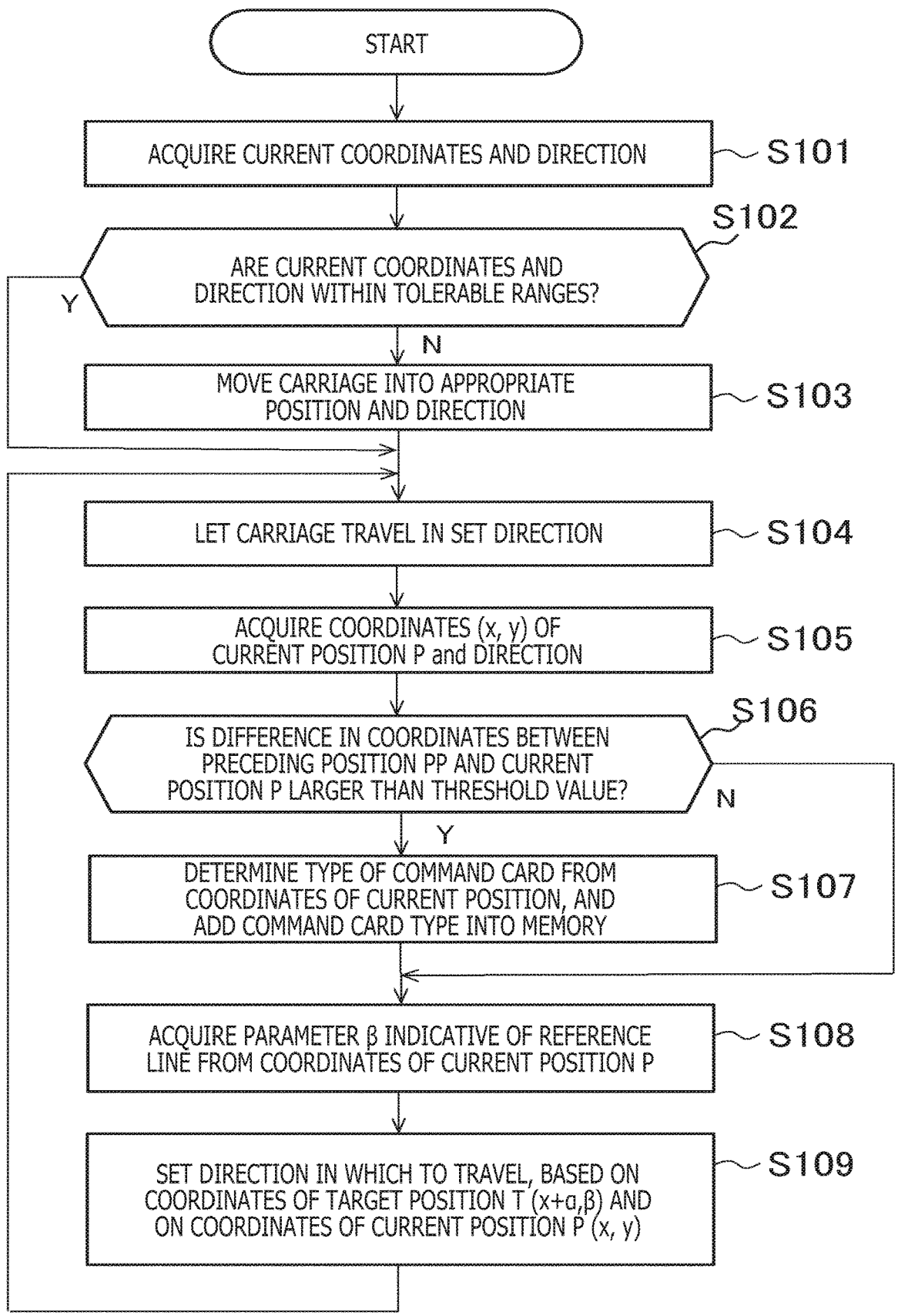
FIG. 8 is a flowchart depicting a typical process of reading command cards.

FIG. 8 is a flowchart depicting a typical process of reading command cards 40. First, the current position acquisition section 51 acquires the current coordinates and direction of the carriage 20 on the basis of the pattern captured by the camera 24 (step S101).

Next, the start control section 52 determines whether or not the current coordinates and direction are within tolerable ranges for the carriage 20 self-propelled to read the hands-on practice program (step S102). In the case where the current coordinates and direction are not in the tolerable ranges (N in step S02), the start control section 52 moves the carriage 20 into an appropriate position and direction (step S103). More specifically, the start control section 52 may control the motors 25 in the carriage 20 to let the carriage 20 be self-propelled into the appropriate position and direction. Alternatively, the start control section 52 may output toward the user a sound prompting the user to manually reposition the carriage 20. In the case where the current coordinates and direction are within the tolerable ranges (Y in step S102), step S103 is skipped.

Next, the travel control section 53 causes the carriage 20 to travel in a set direction (step S104). The set direction is initially the reading direction but will be corrected by a process to be discussed later. From the image captured by the camera 24, the current position acquisition section 51 recognizes the pattern in which the coordinates are coded. Given the coordinates indicated by the pattern, the current position acquisition section 51 acquires the coordinates (x, y) of a current position P at which the carriage 20 is located and the direction of the carriage 20 (step S105). Then, the travel control section 53 determines whether or not there is a difference in coordinates larger than a predetermined threshold value between a preceding position PP obtained previously by the current position acquisition section 51 on one hand and the current position P on the other hand (step S106). The predetermined threshold value is larger than a maximum distance that can be traveled with a measurement interval of the current position P but smaller than a minimum length of the command card 40 in the reading direction. In the case where the difference in coordinates between the preceding position PP and the current position P is larger than the predetermined threshold value (Y in step S106), the travel control section 53 determines that the carriage 20 has moved from a given command card 40 onto another command card 40. The travel control section 53 determines from the current position P the type of the command card 40, i.e., the command of the hands-on practice program indicated by the coordinates of the current position P. The travel control section 53 stores the determined type of the command card 40 into the memory (step S107). In the case where the difference in coordinates between the preceding position PP and the current position P is smaller than the predetermined threshold value (N in step S106), the travel control section 53 determines that the command card 40 on which the carriage 20 is placed has not changed, and skips step S107.

Figure 9:
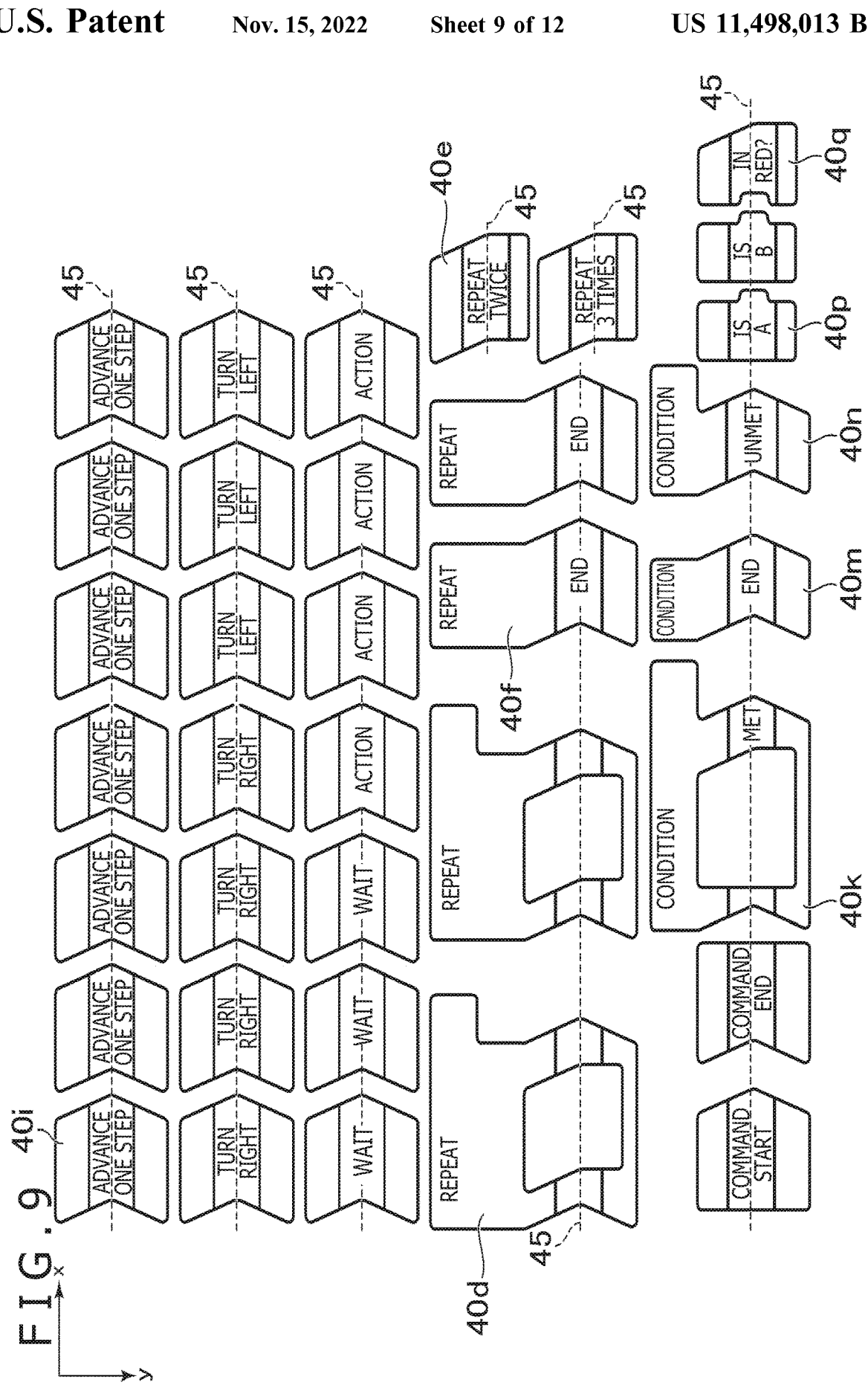
FIG. 9 is a view depicting an example of assigning command cards with respect to a coordinate space.

FIG. 9 is a view depicting an example of assigning command cards 40 with respect to a coordinate space. Although FIG. 9 illustrates images of the command cards 40 for the purpose of simplified explanation, the information indicating the assignment of the command cards 40 relative to the coordinate space need only associate the regions with the types (commands) of the command cards 40. Also, the shapes of the actual command cards 40 need not be stored as the information indicative of their assignment. For example, the information indicating assignment may be information that associates a rectangular region enclosing a command card 40 with the type of that command card 40 indicated by that region. The broken lines in FIG. 9 denote the reference line 45 corresponding to each of the command cards 40. The y coordinate of the reference line 45 varies depending on the command card 40. In the coordinate space, all command cards 40 may be arrayed in the y direction in a straight line centering on the reference line 45. In this case, the y coordinate of the reference line 45 remains unchanged. As can be seen in FIG. 9, the coordinates assigned to each command card 40 in the coordinate space indicate its positional relation relative to the reference line 45.

As illustrated in FIG. 9, each of multiple command cards 40 is assigned its coordinates in the coordinate space. Also, FIG. 9 depicts a command card 40$k$ indicating a conditional branch, a command card 40$m$ indicating the end of a conditional branch, a command card 40$n$ indicating a branch in the case of an unmet condition, and additional cards 40$p$ and 40$q$ indicating detailed conditions, in addition to the command card 40$a$ indicating the start of a program, the command card 40$b$ indicating the end of a program, the command card 40$i$ indicating an ordinary command, the command card 40$d$ indicating a subsequent repeat, the command card 40$f$ indicating the end of a repeat, and the additional card 40$e$.

After the processing of step S107 is terminated or after it is determined in step S106 that the difference between the positions is equal to or smaller than the threshold value, the travel control section 53 acquires a parameter β indicative of the reference line 45 from the coordinates of the current position P. More specifically, the travel control section 53 determines the region of the command card 40 to which the current position P belongs, and acquires the parameter β (here, y coordinate) of the reference line 45 corresponding to the determined region.

Then, the travel control section 53 obtains the coordinates of a target position T (x+α, β), based on the current position P and on the parameter β. On the basis of the target position T and the current position P, the travel control section 53 sets the direction of travel.

Figure 10:
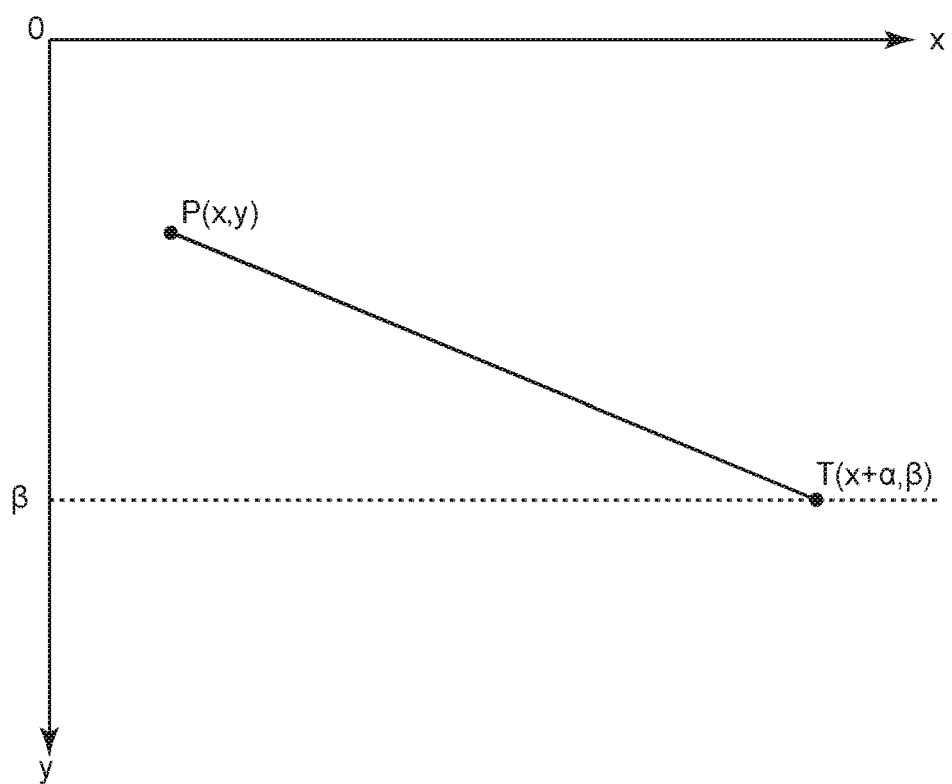
FIG. 10 is a view explaining a method of controlling the carriage.

FIG. 10 is a view explaining a method of controlling the carriage 20. FIG. 10 depicts the current position P and the target position T in the coordinate space. A broken line of which the y coordinate is β corresponds to the reference line 45. The travel control section 53 calculates the direction toward the target position T. The travel control section 53 then changes parameters representing the amounts of rotation of the two motors 25 driving the wheels 254 according to the difference between the current direction acquired in step S105 on one hand and the calculated direction on the other hand. This sets the direction in which the carriage 20 is to travel.

As described above, the present embodiment uses the command cards 40 printed with the patterns in which are coded the coordinates indicating the positional relation with respect to the reference line 45. Using the command cards 40, the embodiment controls the carriage 20 so that the carriage 20 does not deviate from the reference line 45, based on the positional relation between the coordinates indicated by the pattern of each command card 40 captured by the camera 24 of the carriage 20 on one hand and the reference line 45 of that command card 40 on the other hand. Because the positional relation between the positioning parts 41a and 41b of each command card 40 on one hand and the reference line 45 on the other hand remains unchanged, any positional displacement of the reference line 45 corresponding to each command card 40 is prevented. This reduces the possibility of the carriage 20 getting unstable and deviating from command cards 40 when moving from one command card 40 to another adjacent thereto in the course of reading the command cards 40 in sequence.

Figure 11:
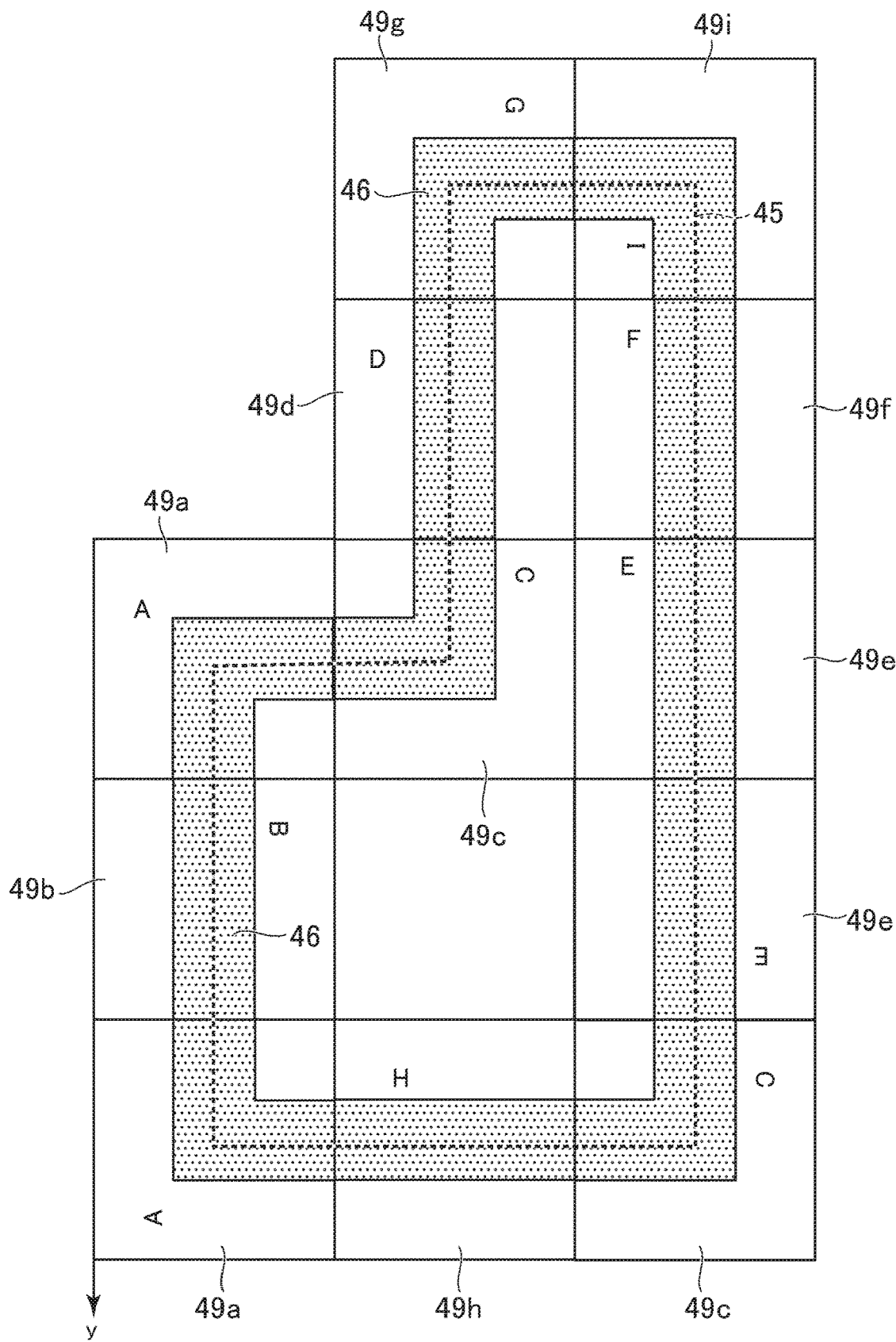
FIG. 11 is a view depicting an example of course cards being arrayed.

Here, the cards from which the control system reads patterns need not be the command cards. FIG. 11 is a view depicting an example of course cards 49 being arrayed. In the example of FIG. 11, a course is created using 9 types of course cards 49 ranging from a course card 49a to a course card 49i. The carriage 20 travels along this course. Each of the course cards 49 is a square.

As with the command cards 40, the course cards 49b, 49d, 49e, 49f and 49h in FIG. 11 are each printed visibly with a marking 46 extended in the reading direction of the carriage 20. Each of the course cards 49b, 49d, 49e, 49f and 49h includes a first end part configured to be adjacent to another course card 49 in the reading direction; and a second end part configured to be on the opposite side of the first end part and adjacent to another course card 49. At the first and the second end parts, the markings 46 are regulated to keep in position the other course cards 49 in a direction intersecting with the reading direction. The markings 46 at the first and the second end parts correspond to the positioning parts 41a and 41b. The reference line 45 and the markings 46 have a predetermined positional relation therebetween. More specifically, there is a constant distance between a particular point in the marking 46 at the first end part and a specific point in the marking 46 at the second end part (e.g., the center of the end parts of the markings 46) on one hand and the reference line 45 on the other hand, regardless of the course card 49.

Also, the course cards 49a, 49c, 49g, and 49i are each printed with a marking 46 that extends perpendicularly from the center of one side of a square constituting the course card 49 and that bends halfway to reach the center of another side connected with that side. Here, the carriage 20 is caused to travel approximately along the markings 46 by a process to be discussed later. Thus, over the course cards 49a, 49c, 49g, and 49i, the markings 46 also extend in the reading direction of the carriage 20. The second end part corresponds to the location through which the carriage 20 enters a given course card 49, and the first end part corresponds to the location through which the carriage 20 moves on to another course card 49. For this reason, on the course cards 49a, 49c, 49g, and 49i, the second end part corresponds to one side of a square, and the first end part corresponds to another side connected with that side. Also on the first course cards 49a, 49c, 49g, and 49i, the markings 46 at the first and the second end parts correspond respectively to the positioning parts 41a and 41b. The reference line 45 and the markings 46 have a predetermined positional relation therebetween.

Figure 12:
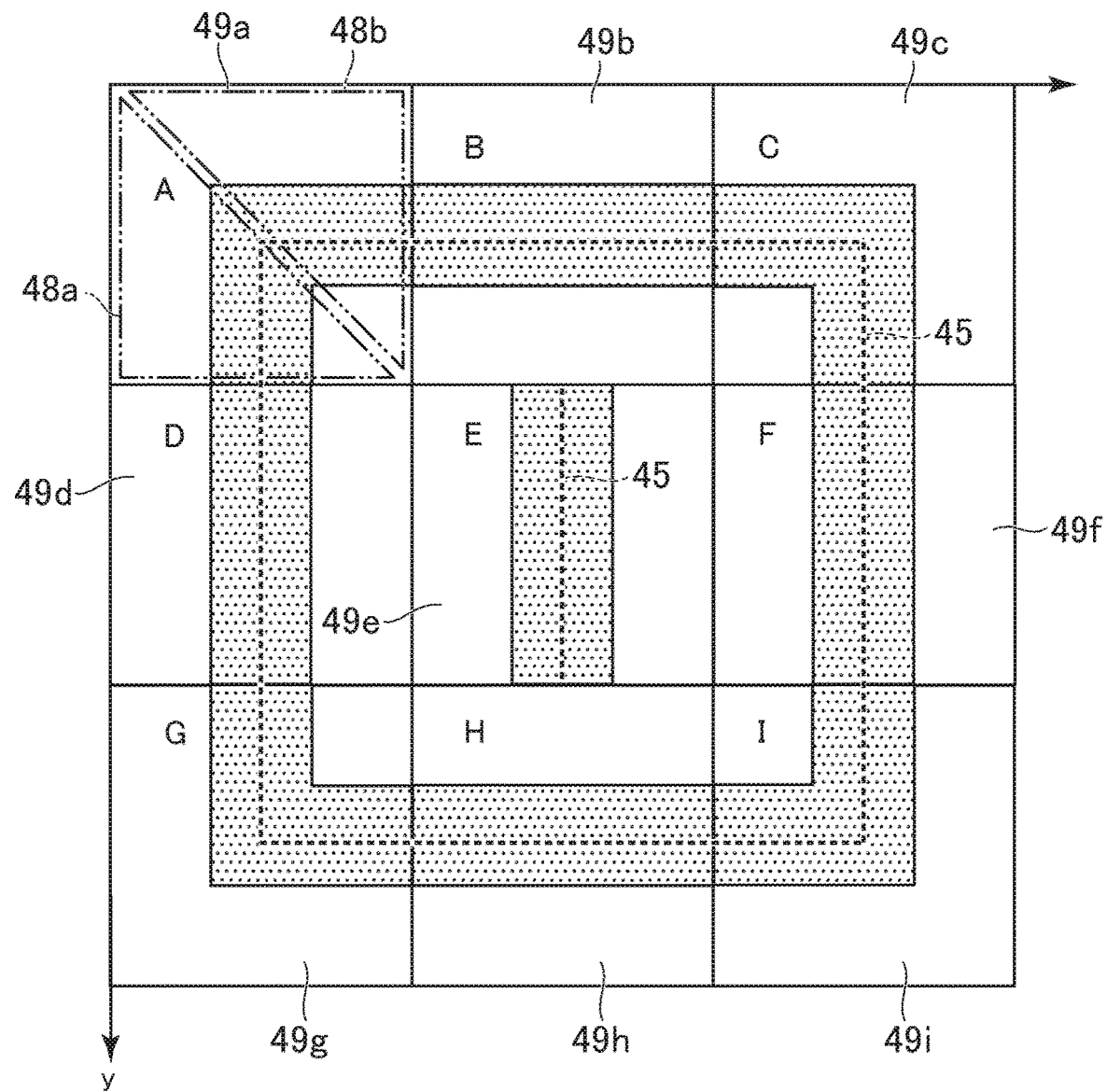
FIG. 12 is a view depicting an example of assigning the course cards with respect to a coordinate space.

As with the command cards 40, the upper surfaces of the course cards 49 are printed with patterns in which the coordinates of the cards in a coordinate space are coded. FIG. 12 is a view depicting an example of assigning the course cards 49 with respect to the coordinate space. As illustrated in FIG. 12, the course cards 49 are assigned their regions in a manner paving the coordinate space. The reference line 45 is defined for each course card 49. Furthermore, the upper surfaces of the course cards 49a, 49c, 49g, and 49i of which the markings 46 are bent are each divided by a bent boundary portion into a region 48a and a region 48b. The linear reference line 45 is provided in each of the regions 48a and 48b. These reference lines 45 are connected with each other at the boundary between the regions 48a and 48b.

As depicted in FIG. 11, multiple course cards 49 of the same type (course cards 49a, 49c, and 49e in the example of FIG. 11) may be used. As can be seen in FIGS. 11 and 12, arraying the course cards 49 can bring about a more reduction in the size of the coordinate regions necessary for creating a course than if consecutive coordinate regions are assigned to the entire course.

Explained next is the process performed by the travel control section 53 regarding the examples in FIGS. 11 and 12, with emphasis on the differences from the earlier example in FIG. 8. In the current example, the start position is not clearly defined. Thus, instead of performing the processing of steps S102 and S103, the travel control section 53 sets an initial traveling direction for the carriage 20 on the basis of the current coordinates and direction.

In step S106, the travel control section 53 determines that the carriage 20 has moved onto another course card 49 not only in the case where the difference in coordinates between the preceding position PP and the current position P is larger than the threshold value but also where the difference between the preceding direction of the carriage 20 and its current direction is larger than a direction threshold value. The direction threshold value is larger than 90 degrees.

In step S107, the travel control section 53 determines the type of the course card 49. The travel control section 53 not only adds the determined type of the course card 49 into the memory but also acquires the advancing direction of the carriage 20 on the basis of the coordinates of the current position P. More specifically, on the basis of the coordinates of the current position P, the travel control section 53 determines that the first or the second end part of the course card 49 that is closer to the current position P than the other end part is the entrance side. The travel control section 53 then determines that the carriage 20 advances from the entrance side end part toward a target side end part.

In the examples of FIGS. 11 and 12, course cards 49 of the same type are arrayed end to end in some cases. Particularly, in a segment in FIG. 11 where the course cards 49e are continuously arrayed in the vertical direction, the bottom sides of the assigned coordinate regions are made adjacent to each other. In this case, the carriage movement from the preceding course card 49e onto the next course card 49e cannot be sensed using solely the amount of change in coordinates. In such a case, the movement onto the next course card 49 can still be sensed by detecting differences of the direction of the carriage 20 in the coordinate space.

In steps S108 and S109, the travel control section 53 acquires the reference line according to the type of the course card 49 and the current position P. More specifically, in the case of straight-line course cards 49 such as the course card 49b, the travel control section 53 acquires the center position of the reference line 45 and its extended direction. In the case of course cards 49 such as the course cards 49a, 49c, 49g, and 49i on which the advancing direction changes, the travel control section 53 determines whether the current position P is in the region 48a or in the region 48b and, depending on the determined region, acquires the center position of the reference line 45 and its extended direction inside that region. Then, on the basis of the advancing direction of the carriage 20 and the coordinates of the current position, the travel control section 53 calculates the target position in such a manner that the target position is in a direction in which the carriage 20 moves closer to the target-side end part from the current position along the reference line 45 or its extended line.

The above-described steps allow the carriage 20 to read the contour of the course. Here, the travel control section 53 may determine whether or not the carriage 20 is reading a given course card 49 placed at an overlapping position. In the case of the overlap, there is a high possibility that the course is a circuit course. Following the determination of the overlap, the travel control section 53 may calculate a route along which the carriage 20 will move more efficiently over the course cards 49, based on the read course, and perform control to let the carriage 20 travel along the calculated route. Preferably, the travel control section 53 may allow for more and more course cards 49 to be laid out in front of the carriage 20 during traveling.

It should be noted that, instead of having the course cards 49 laid out, patterns similar to the arrayed course cards 49 may be printed. In this case, the advantageous effect of using the coordinate space efficiently is still made available.

The invention claimed is:

1. A card comprising:
    a first end part configured to be adjacent to another card in a predetermined direction;
    a second end part configured to be on an opposite side of the first end part and adjacent to another card different from the first end part; and
    a surface printed with a pattern in which are coded coordinates indicating a positional relation relative to a reference line extended in the predetermined direction indicative of a region in which a self-propelled device is to travel, wherein
    each of the first and the second end parts has a positioning part regulating how the other card adjacent to the end part is to be placed, and
    the positioning parts and the reference line have a predetermined positional relation.

2. The card according to claim 1, wherein the positioning part belonging to one of the first and the second end parts has a recessed portion and the positioning part belonging to the other end part has a projected portion in planar view.

3. The card according to claim 1, wherein the surface is printed with a line extended in the predetermined direction to constitute the positioning parts.

4. The card according to claim 1, further comprising:
    an opening configured to intersect with the reference line in planar view,
    wherein an additional card printed with a pattern in which are coded the coordinates indicating the positional relation relative to the reference line is fitted into the opening.

5. A card reading system comprising:
    a current position acquisition means configured to acquire a current position of a self-propelled device by recognizing a pattern printed on a card having a first end part and a second end part, the first end part having a positioning part regulating how another card adjacent to the first end part in a predetermined direction is to be placed, the second end part having a positioning part located on an opposite side of the first end part to regulate how another card adjacent to the second end part is to be placed, the pattern being one in which coordinates indicating a positional relation relative to a reference line extended in the predetermined direction are coded; and
    a travel control section configured to control the self-propelled device to travel, on a basis of the acquired current position and the reference line.

6. A card set comprising a plurality of cards configured to be arrayed in a predetermined direction, each of the cards including:
    a first end part configured to be adjacent to another card;
    a second end part configured to be on an opposite side of the first end part and adjacent to another card different from the first end part; and
    a surface printed with a pattern in which are coded coordinates indicating a positional relation relative to a reference line extended in the predetermined direction indicative of a region in which a self-propelled device is to travel,
    wherein each of the first and the second end parts has a positioning part regulating how the other card adjacent to the end part is to be placed, and
    the positioning parts and the reference line have a predetermined positional relation.

* * * * *